Sept. 30, 1969  JEAN-MARIE L. A. VERDIN  3,470,046
METHOD OF HEAT SHRINKING THERMOPLASTIC
COVERINGS TO TUBULAR METAL BODIES
Filed Feb. 11, 1966

Inventor:
Jean-Marie Louis VERDIN
by: J. Delattre-Seguy
Attorney

United States Patent Office 3,470,046
Patented Sept. 30, 1969

3,470,046
METHOD OF HEAT SHRINKING THERMOPLASTIC COVERINGS TO TUBULAR METAL BODIES
Jean-Marie Louis Augustin Verdin, Pont-A-Mousson, France, assignor to Centre de Recherches de Pont-A-Mousson, Pont-A-Mousson (Meurthe-et-Moselle), France, a French body corporate
Filed Feb. 11, 1966, Ser. No. 526,731
Claims priority, application France, Apr. 14, 1965, 13,141
Int. Cl. B32b 1/08, 27/16; B29c 27/20
U.S. Cl. 156—86    2 Claims

ABSTRACT OF THE DISCLOSURE

Method for providing a tubular metal body with a thermoplastic covering which is intended to permanently adhere to this body. A previously heat-expanded thermoplastic sheath, having an initial diameter less than but an expanded diameter greater than that of the body, is placed round the body and heating means having an axial extent considerably less than the length of the sheath is placed around one end of the sheath and the sheath and the body are moved axially through the heating means so that the sheath is shrunk onto the body progressively and trapping of air between the sheath and body is avoided.

---

The present invention relates to the covering of metal tubular bodies with sheaths of thermoplastic materials.

It is known to cover a cylindrical object with a thermoplastic sheath by heat shrinking the latter. It is merely necessary to take a sheath having a diameter slightly less than that of the object to be covered, prestress the sheath by expanding it to a diameter greater than that of he cylindrical object, and cover the latter with the sheath. The expanded sheath is passed over the object and then applied thereon with a high gripping effect by heating. It is known that a plastics sheath, composed for example of polyvinyl chloride, has when it is prestressed the property of resuming, when heated, its initial dimensions before the expansion owing to the fact that this heating relieves the internal stresses created when expanding the sheath.

This known method is very simple. However, when it is employed with tubular bodies or metal pipes of great length by placing the tubular bodies wholly within an oven where the heat shrinkage is effected, good results are not obtained. Indeed, the sheath shrunk in one operation throughout its length is applied on the tubular body in such manner that air is trapped thereunder and blisters are formed and folds are created if it is attempted to smooth out the sheath after its application.

The object of the invention is to provide an improved method of covering metal tubular bodies whereby it is possible to apply thereon a thermoplastic sheath by the heat shrinkage thereof in a perfect manner without trapping air and without forming blisters or wrinkles.

The invention provides an improved method which permits obtaining in a single operation a perfectly smooth adhered covering and is of the known type mentioned hereinbefore in which a thermoplastic sheath having an initial inside diameter less than the outside diameter of the tubular body to be covered and a length corresponding to that of said body is expanded so as to have an inside diameter substantially greater than the outside diameter of said body at a temperature which is just sufficient to soften and prestress the thus expanded sheath before slipping it over the body, said prestressed expanded sheath covering the tubular body being heated over a short axial length from one end of the sheath and the heating zone being moved progressively towards the other end of the sheath so as to progressively shrink the sheath onto the tubular body from one end to the other of the latter while expelling the air towards the end which is not yet shrunk.

This method is extremely advantageous owing to its efficiency and great simplicity.

Another object of the invention is to provide an apparatus for carrying out the aforementioned method. Said apparatus comprises in combination a short annular oven open at both ends and means for passing the tubular metal body previously covered with the sheath therefor through the oven in a continuous manner so as to heat the sheath over a circular zone, whose length corresponds to that of the oven, in a continuous manner from one end of the tubular body to the other.

This very simple apparatus can be constructed just as well in the factory as on outside sites where it is easy to construct a runway and where electrical energy, steam or a hot liquid are available for circularly heating a short length of a tubular body.

Another object of the invention is to provide the tubular bodies covered by said method with said apparatus.

Further features and advantages of the invention will be apparent from the ensuing description with reference to the accompanying drawings to which the invention is in no way limited.

In the illustrated embodiment, the invention is applied to a metal pipe 1 composed of steel, cast iron or any other metal or metal alloy. This pipe must be covered with a sheath 2 of rigid polyvinyl chloride or some other thermoplastic plastics material, such as a mixture selected from those containing polyvinyl chloride, polyolefins, polystyrenes, cellulosic derivatives.

Figure 1:
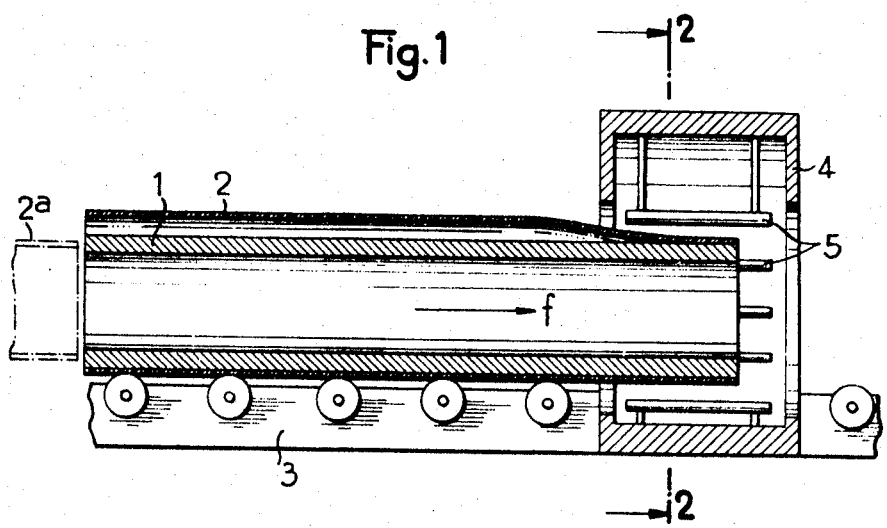
FIG. 1 is a diagrammatic sectional view of an apparatus according to the invention for carrying out said improved method.
Figure 2:
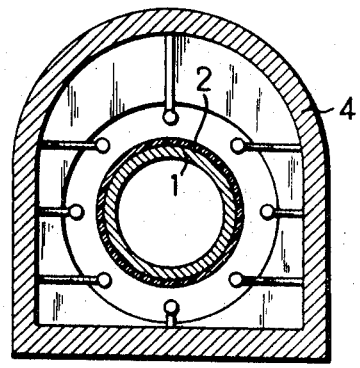
FIG. 2 is a sectional view of the heating device, taken along line 2—2 of FIG. 1.

The sheath 2 has a length corresponding to the length of the pipe 1 and an initial diameter less than that of the pipe (see the dot-dash lines in FIG. 1) and is previously expanded at a temperature slightly greater than the minimum softening temperature so as to assume at 2 a diameter substantially greater than the outside diameter of the pipe 1. As known, this hot expansion creates internal stresses which remain in a latent state in the rigid tubular sheath after the cooling thereof. In other words, the sheath 2 is prestressed.

The expanded sheath 2 is slipped, with clearance and in the cold state, over the pipe 1 without being applied onto but merely covering the latter, then the pipe covered with the sheath is conveyed to the device described hereinafter which applies the sheath onto the pipe in a perfect manner.

Said apparatus in the illustrated embodiment comprises a roller conveyor 3 and heating means consisting of a short annular oven or furnace 4. It comprises internally for example a number of infrared ray lamps 5 which are arranged circularly so as to surround the sheath which is to be heated on the pipe.

When the pipe is conveyed on the conveyor 3 in the direction of arrow $f$ (FIG. 1) into the oven 4 the sheath 2 is suitably heated to such temperature as to release the internal stresses therein due to the expansion and shrinks in the known manner owing to the release of said stresses. The sheath then tends to resume the initial diametrical dimensions it had before the expansion thereof, that is an inside diameter less than the outside diameter of the pipe. Thus, in the end zone located inside the oven 4 the sheath 2 closely tightens around the pipe. Consequently, the air which initially existed in the free space between the sheath 2 and the pipe 1 is expelled from the shrunk zone in a direction opposed to the arrow f towards the other end of the pipe.

As the pipe and the sheath are moved in the direction of arrow f through the oven 4, the sheath therefore progressively tightens around the pipe and the air between the sheath 2 and the pipe 1 is expelled in the direction of the free space still existing between the sheath 2 and the pipe 1 on the upstream side of the oven relative to the direction of movement of the pipe.

Consequently, no air pocket can be trapped between the shrunk sheath 2 and the pipe 1 and no blisters are formed.

Further, owing to the heat shrinkage which is localized at each instant over a short length of the pipe 1 corresponding to the length of the oven 4 and owing to the fact that this shrinkage gradually extends over the entire length of the pipe 1 the sheath remains under tension from the end at which it first tightened around the pipe 1. Thus no wrinkle can form. The covering formed by the sheath 2 is consequently perfectly smooth without need for any additional manual or mechanical operation.

Figure 3:
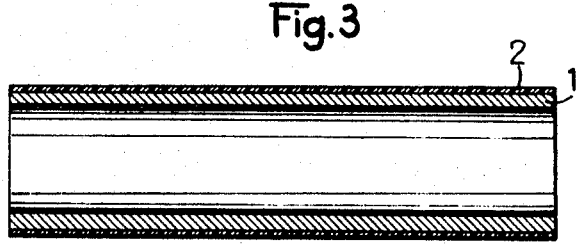
FIG. 3 is an axial sectional view of the tubular body covered by the method according to the invention.

There is obtained the sheathed tube shown in FIG. 3 in which the sheath 2 strongly adheres to the pipe 1 throughout its length without wrinkles or blisters.

As can be seen, the sheathing operation according to the invention is simple to carry out.

The apparatus can be easily constructed on a exterior site since it merely requires a runway, such as the roller conveyor 3, and an annular oven 4 of small size or portable furnace and available electrical energy.

There will now be given numerical examples of applications of the method.

EXAMPLE I

The tube has a nominal diameter of 100 mm., an outside diameter of 125 mm. and a length of 6 m.
  The sheath is of polyvinyl chloride and 1.1 mm. thick.
  Expansion temperature: 130–150° C.
  Length of the shrinkage heating zone: 2,500 mm.
  Shrinkage temperature: 115–140° C.
  Rate of travel of the shrinkage zone: 2.7 m. per minute.

EXAMPLE II

Tube having a nominal diameter of 55 mm., an outside diameter of 67 mm. and a length of 4 m.
  Polyvinyl chloride sheath 0.6 mm. thick.
  Expansion temperature: 120–140° C.
  Length of the shrinkage heating zone: 1,750 mm.
  Shrinkage temperature: 100–130° C.
  Rate of travel of the shrinkage zone: 5 m. per minute.

As can be seen, when the sheath is thinner and the pipe is smaller the desired temperatures are more rapidly reached so that the feed rate and therefore the sheathing speed is higher. On the other hand, when the sheath is thicker and the tube is also thicker and has a larger diameter and a greater length, owing to the increased thermal inertia the necessary heating time is longer so that the feed rate is slower.

Thus, instead of shifting the pipe and sheath assembly with respect to the oven, the oven could be shifted with respect to this assembly from one end of the pipe to the other.

Moreover, as is known, the sheath can be mounted on a pipe already provided with a covering.

Instead of employing infrared ray lamps as the heating means, there could be employed electrical resistances, steam, or a sleeve containing a circulation of hot air or hot liquid, such as oil or glycol, or a device employing high-frequency induction heating. All these heating means give good results.

Having now described my invention what I claim as new and desire to secure by Letters Patent is:

1. In a method for providing a tubular metal body with a thermoplastic covering which is intended to permanently adhere to the body and comprising the steps of taking a thermoplastic sheath having an inside diameter less than the outside diameter of said body, expanding the sheath at a temperature just sufficient to soften the material of the sheath and thus obtain a prestressed expanded sheath having an inside diameter substantially greater than the outside diameter of said body, cooling the expanded sheath, mounting the expanded sheath in the cool state on said body and shrinking the expanded sheath onto said body, the feature that the expanded sheath is progressively shrunk onto said body by heating the sheath with heating means whose extent axially of the sheath is shorter than the sheath so as to heat the sheath locally in an axially short zone of the sheath by starting at one end of the sheath, and effecting a relative displacement between the heating means and the sheath and said body and thereby cause said zone of heating to travel progressively towards the other end of the sheath whereby the sheath is progressively shrunk onto said body from said one end to said other end of the sheath while precluding the trapping of air between the sheath and said body and the subsequent consequential formation of wrinkles in the sheath.

2. Method as claimed in claim 1, wherein the zone of heating is caused to travel towards said other end of the sheath by shifting the tubular body and the sheath thereon with respect to a stationary heating means.

References Cited

UNITED STATES PATENTS

| 3,056,171 | 10/1962 | Fite _____ 156—85 XR |
| 2,429,340 | 10/1947 | Bailey _____ 264—230 |
| 3,083,130 | 3/1963 | Strandquist _____ 156—381 XR |
| 1,129,084 | 2/1915 | Gammeter. |

PHILIP DIER, Primary Examiner

U.S. Cl. X.R.

138—143; 156—294, 381; 263—7; 264—230